US012722081B2

(12) United States Patent
Chen

(10) Patent No.: US 12,722,081 B2
(45) Date of Patent: Sep. 1, 2026

(54) FRIEND-MAKING CONTENT RECOMMENDATION METHOD AND APPARATUS, DEVICE, AND STORAGE MEDIUM

(71) Applicant: Tencent Technology (Shenzhen) Company Limited, Shenzhen (CN)

(72) Inventor: Teng Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 168 days.

(21) Appl. No.: 18/884,091

(22) Filed: Sep. 12, 2024

(65) Prior Publication Data

US 2025/0001297 A1 Jan. 2, 2025

Related U.S. Application Data

(63) Continuation of application No. PCT/CN2023/120993, filed on Sep. 25, 2023.

(30) Foreign Application Priority Data

Dec. 30, 2022 (CN) ......................... 202211738504.4

(51) Int. Cl.
*G06Q 30/02* (2023.01)
*A63F 13/533* (2014.01)

(52) U.S. Cl.
CPC .................................. *A63F 13/533* (2014.09)

(58) Field of Classification Search
CPC .... A63F 13/533; G06F 3/048; G06F 16/9535; G06F 16/9536; G06F 16/954;
(Continued)

(56) References Cited

U.S. PATENT DOCUMENTS 11,734,029 B1 * 8/2023 Govindan ............... G06F 9/451 715/745
2007/0188444 A1 * 8/2007 Vale ...................... G06F 3/0421 345/156

(Continued)

FOREIGN PATENT DOCUMENTS

CN 107330800 A 11/2017
CN 111382348 A 7/2020

(Continued)

OTHER PUBLICATIONS

"Doing Research with a Gamified Survey: Reflections From Smart City Research" (Rijshouwer, Emiel; and Van Zoonen, Liesbet; published online on Mar. 1, 2022; https://doi.org/10.1177/089443932110735) (Year: 2022).*

(Continued)

*Primary Examiner* — James M Detweiler
(74) *Attorney, Agent, or Firm* — Morgan, Lewis & Bockius LLP

(57) ABSTRACT

This application discloses a friend-making content recommendation method and apparatus, a device, and a storage medium, and relates to the field of friend-making content recommendation technologies. The method is performed by a client, and includes: displaying a friend-recommendation question answering interface (302), the friend-recommendation question answering interface displaying a virtual character of a first user account, a friend-recommendation question, and a plurality of movement paths in a virtual environment, and the plurality of movement paths being in one-to-one correspondence with a plurality of candidate answers to the friend-recommendation question; moving the virtual character in the virtual environment in response to a movement operation on the virtual character (304); and displaying a friend-recommendation interface (306), the friend-recommendation interface displaying friend-recom-
(Continued)

mendation content, the friend-recommendation content being content recommended to the first user account based on a selected answer, and the selected answer being determined from the plurality of candidate answers based on the movement of the virtual character on a movement path selected from the plurality of movement paths.

18 Claims, 9 Drawing Sheets

(58) Field of Classification Search
CPC .......... G06Q 50/00; G06Q 10/40; G09B 7/02; G06T 13/40; G06T 19/003
See application file for complete search history.

(56) References Cited

U.S. PATENT DOCUMENTS

2008/0195238 A1* 8/2008 Takahashi .............. G06Q 10/10 700/91
2012/0054281 A1* 3/2012 Westmoreland ....... G06Q 10/10 709/205
2014/0128166 A1* 5/2014 Tam ...................... A63F 13/216 463/42
2017/0006343 A1 1/2017 Miller et al.
2021/0034685 A1* 2/2021 Miller ................... G06F 16/437

FOREIGN PATENT DOCUMENTS

CN 112148971 A 12/2020
CN 114743422 A * 7/2022 .............. G06F 3/011
CN 115239410 A 10/2022

OTHER PUBLICATIONS

Tencent Technology, ISR, PCT/CN2023/120993, Nov. 22, 2023, 3 pgs.

* cited by examiner

501
Friends matching
(1/5) Do you often actively compliment others?
Yes
No
503
502
There are 200 users with the same selection as yours!
504
Please follow a direction of your answer

FRIEND-MAKING CONTENT RECOMMENDATION METHOD AND APPARATUS, DEVICE, AND STORAGE MEDIUM

CROSS-REFERENCE TO RELATED APPLICATIONS

This application is a continuation application of PCT Patent Application No. PCT/CN2023/120993, entitled "FRIEND-MAKING CONTENT RECOMMENDATION METHOD AND APPARATUS, DEVICE, AND STORAGE MEDIUM" filed on Sep. 25, 2023, which claims priority to Chinese Patent Application No. 202211738504.4, entitled "FRIEND-MAKING INTERFACE DISPLAY METHOD AND APPARATUS, DEVICE, AND STORAGE MEDIUM" filed on Dec. 30, 2022, both of which are incorporated herein by reference in their entirety.

FIELD OF THE TECHNOLOGY

This application relates to the field of friend-making content recommendation technologies, and in particular, to a friend-making content recommendation method and apparatus, a device, and a storage medium.

BACKGROUND OF THE DISCLOSURE

A server of a social client can recommend, according to a social question answered by a user in the social client, another user who may be of interest to the user based on an answer selected by the user.

In related art, a social client displays a plurality of social questions in a user interface, as well as options corresponding to a plurality of candidate answers to the social questions. When a user clicks/taps an option of a selected answer of the user, the social client acquires the answer selected by the user to the social question and sends the answer to a server. The server then recommends to the user another user who has selected the same/similar answer to the social question.

In the foregoing solution, the user selects the answer to the social question by clicking/tapping the answer option. The selection method is monotonous, and there is a strong sense of separation between a selection process and a selection result.

SUMMARY

This application provides a friend-making content recommendation method and apparatus, a device, and a storage medium, to avoid misoperation of a user when answering a friend-recommendation question. The technical solutions are as follows:

According to an aspect of this application, a method for recommending friends to a virtual character in a virtual environment is performed by a computer device. The method includes:

- displaying a friend-recommendation question answering interface, the friend-recommendation question answering interface including a virtual character of a first user account, a friend-recommendation question, and a plurality of movement paths in a virtual environment, and each movement path corresponding to a respective one of a plurality of candidate answers to the friend-recommendation question;
- moving the virtual character in the virtual environment on a movement path selected from the plurality of movement paths in response to a movement operation on the virtual character by a user of the computer device; and
- displaying a friend-recommendation interface, the friend-recommendation interface including friend-recommendation content recommended to the first user account based on an answer selected from the plurality of candidate answers corresponding to the selected movement path from the plurality of movement paths.

According to another aspect of this application, a computer device is provided. The computer device includes a processor and a memory. The memory has at least one instruction, at least one program, and a code set or an instruction set stored therein, and the at least one instruction, the at least one program, and the code set or the instruction set are loaded and executed by the processor to implement the method for recommending friends to a virtual character in a virtual environment according to the foregoing aspect.

According to another aspect of this application, a non-transitory computer-readable storage medium is provided. The readable storage medium has at least one instruction, at least one program, and a code set or an instruction set stored thereon, and the at least one instruction, the at least one program, and the code set or the instruction set, when loaded and executed by a processor of a computer device, cause the computer device to implement the method for recommending friends to a virtual character in a virtual environment according to the foregoing aspect.

The technical solutions provided in this application have at least the following beneficial effects:

An interactive method of selecting an answer to a social question is to control a virtual character to move in a movement path corresponding to a candidate answer to the social question. A new selection method is provided, to combine a selection operation on a candidate answer to a friend-recommendation question with a virtual environment, so as to allow a user to be more immersed in a selection process of the candidate answer, thereby making transition between the selection process and a selection result smooth and natural and reducing a sense of separation.

DESCRIPTION OF EMBODIMENTS

Figure 1:
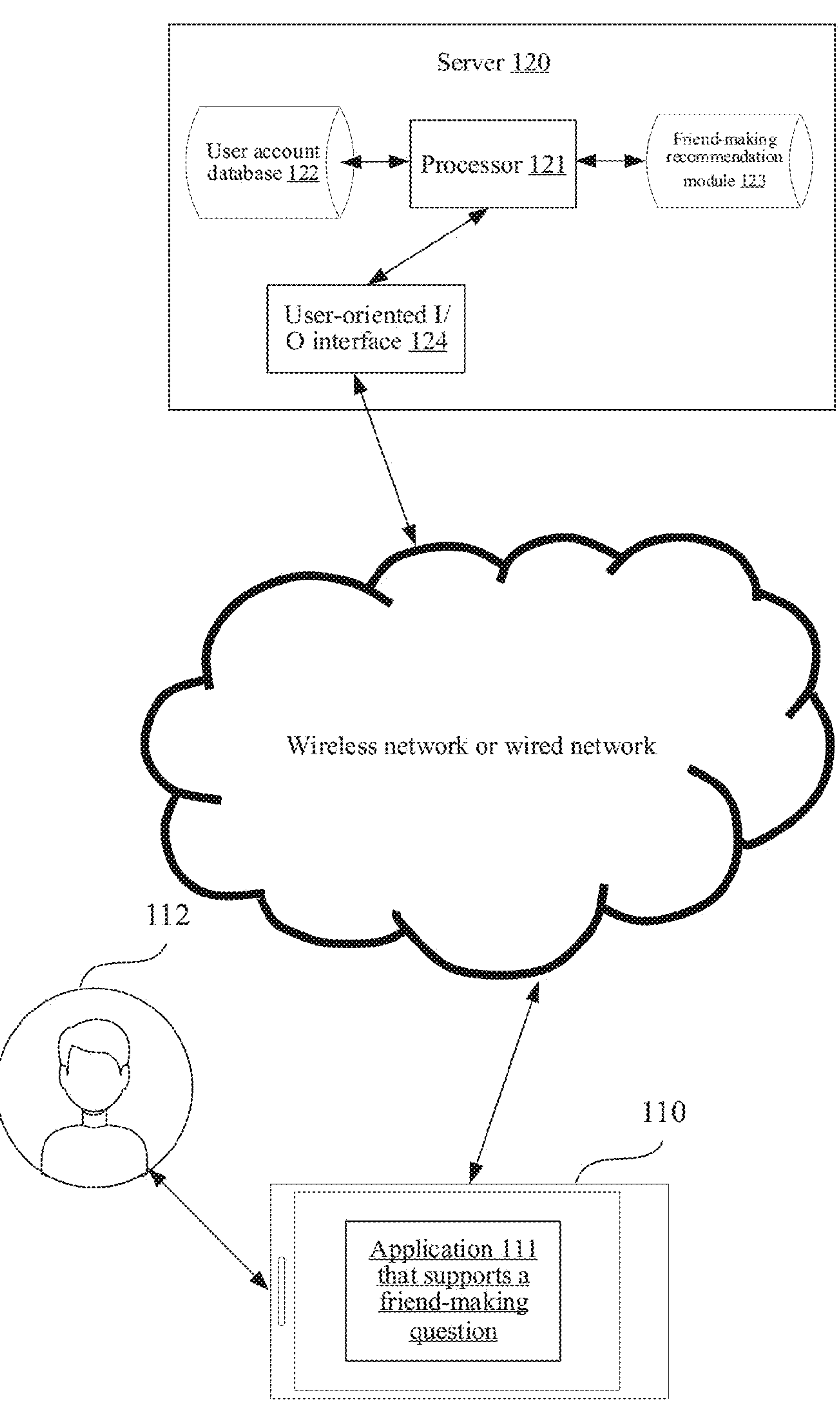
FIG. 1 is a block diagram of a structure of a computer system according to an exemplary embodiment of this application.

FIG. 1 is a block diagram of a structure of a computer system according to an exemplary embodiment of this application. The computer system 100 includes: a terminal 110 and a server 120.

An application 111 (a client) that supports a friend-recommendation question is installed in and run on the terminal 110. When the terminal 110 call the application 111 to run, a user interface of the application 111 is displayed on a screen of the terminal 110. The application 111 that supports a friend-recommendation question can provide a user with a function of recommending friend-recommendation content based on an answer selected by the user to the friend-recommendation question. The terminal 110 is a terminal used by a user 112, and a user account of the user 112 is logged in the application 111. The terminal 110 may be generally one of a plurality of terminals. In some embodiments, a device type of the terminal 110 includes at least one of a smart phone, a tablet, an e-book reader, an MP3 player, an MP4 player, a portable laptop computer, or a desktop computer.

The terminal 110 is connected to the server 120 over a wireless network or a wired network.

The server 120 includes at least one of a server, a plurality of servers, a cloud computing platform, or a virtualization center. The server 120 is configured to provide a background service for the application 111 that supports a friend-recommendation question. In some embodiments, the server 120 is responsible for primary computing work, and the terminal 110 is responsible for secondary computing work. Alternatively, the server 120 is responsible for secondary computing work, and the terminal 110 is responsible for primary computing work. Alternatively, a distributed computing architecture may be used between the server 120 and the terminal 110 for collaborative computing.

For example, the server 120 includes a processor 121, a user account database 122, a friend-making recommendation module 123, and a user-oriented input/output interface (I/O interface) 124. The processor 121 is configured to load instructions stored in the server 120 and process data in the user account database 122 and the friend-making recommendation module 123. The user account database 122 is configured to store data of user accounts used by the terminal 110 and another terminal, such as avatars of the user accounts, nicknames of the user accounts, and groups to which the user accounts belong. The friend-making recommendation module 123 is configured to: provide the application 111 with friend-recommendation questions and candidate answers to the friend-recommendation questions, determine friend-recommendation content based on answers selected by a user to the friend-recommendation questions, and send the friend-recommendation content to the application 111. The user-oriented I/O interface 124 is configured to establish communication with the terminal 110 over a wireless network or a wired network for data exchange.

Figure 2:
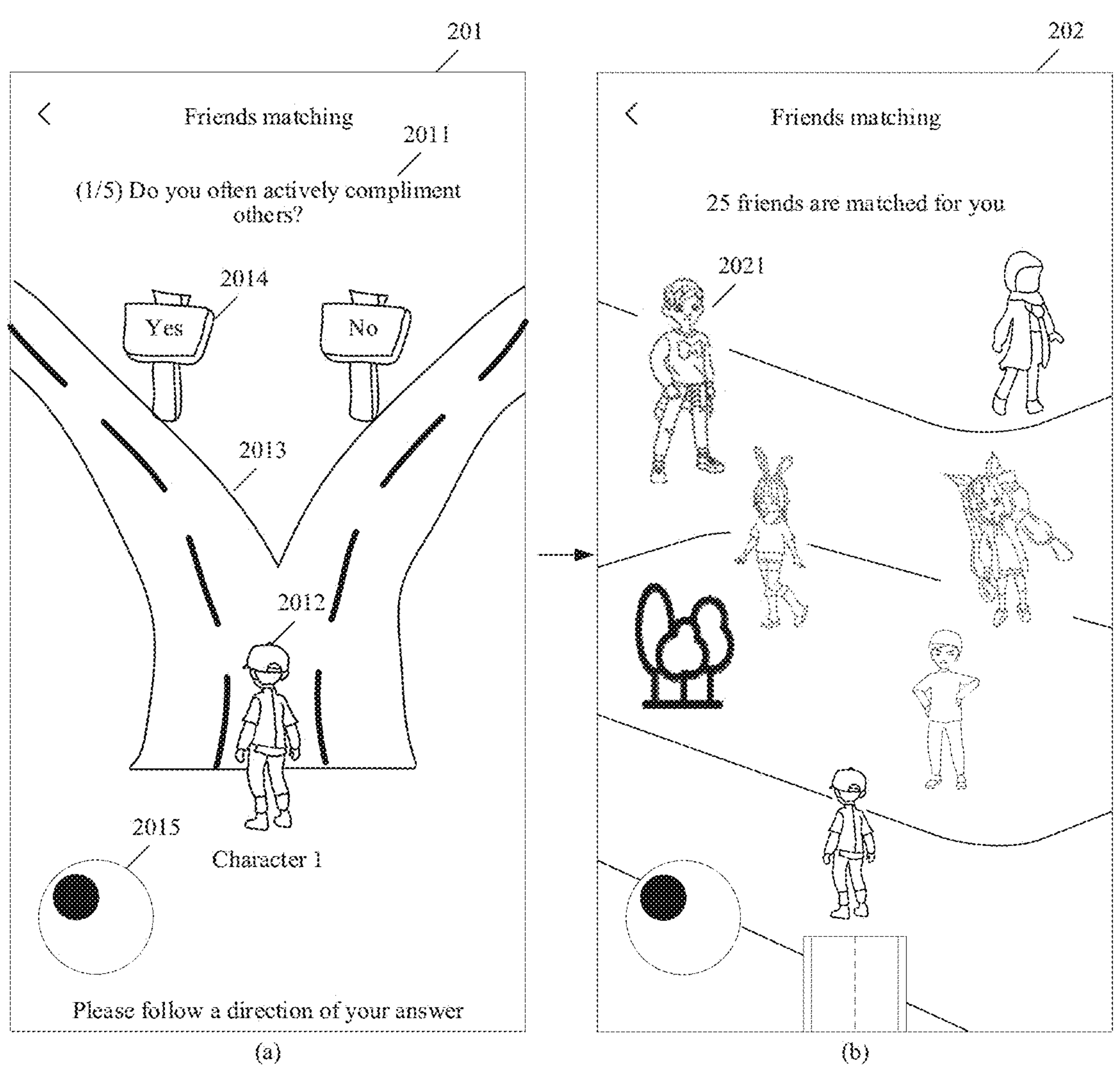
FIG. 2 is a schematic diagram of a friend-making interface according to an exemplary embodiment of this application.

FIG. 2 is a schematic diagram of a friend-making interface according to an exemplary embodiment of this application. As shown in section (a) in FIG. 2, a client displays a friend-recommendation question answering interface 201. The friend-recommendation question answering interface 201 is configured for a user to answer a friend-recommendation question 2011, and the friend-recommendation question answering interface 201 corresponds to a plurality of friend-recommendation questions 2011. The friend-recommendation question answering interface 201 displays a virtual character 2012 of a first user account, an $i^{th}$ friend-recommendation question 2011 among the plurality of friend-recommendation questions 2011, and a plurality of movement paths 2013 in a virtual environment. The plurality of movement paths 2013 are in one-to-one correspondence with a plurality of candidate answers 2014 to the $i^{th}$ friend-recommendation question 2011, and i is a positive integer. The client displays, around each of the movement paths 2013, the candidate answer 2014 corresponding to the movement path.

The client moves the virtual character 2012 in the virtual environment in response to a movement operation on the virtual character 2012. For example, the user controls, by using a wheel 2015, the virtual character 2012 to move. The client displays, in response to the virtual character 2012 moving to an end point of a selected movement path 2013 among the plurality of movement paths 2013 corresponding to the $i^{th}$ friend-recommendation question 2011, an $(i+1)^{th}$ friend-recommendation question 2011 and a plurality of movement paths 2013 corresponding to the $(i+1)^{th}$ friend-recommendation question 2011 in the friend-recommendation question answering interface 201, and determines a candidate answer 2014 corresponding to the selected movement path 2013 selected by the virtual character 2012 as a selected answer to the $i^{th}$ friend-recommendation question 2011. For example, in FIG. 2, the $i^{th}$ friend-recommendation question 2011 is "do you often actively compliment others?". When the virtual character 2012 moves to an end point of a movement path 2013 corresponding to an answer "yes", the client determines the answer "yes" as the selected answer to the $i^{th}$ friend-recommendation question 2011. The client repeats the foregoing process until the last friend-recommendation question 2011 and a plurality of movement paths 2013 corresponding to the last friend-recommendation question are displayed.

As shown in section (b) in FIG. 2, the client displays a friend-recommendation interface 202 in response to the virtual character moving to an end point of a selected movement path 2013 among the plurality of movement paths 2013 corresponding to the last friend-recommendation question 2011 among the plurality of friend-recommendation questions 2011, that is, the user answers all of the friend-recommendation questions 2011. The friend-recommendation interface 202 displays friend-recommendation content 2021, and the friend-recommendation content 2021 is determined based on selected answers selected by a user account to all of the friend-recommendation questions 2011. The user may interact with the displayed friend-recommendation content 2021 by controlling the virtual character 2012. For example, the friend-recommendation content 2021 is a recommended virtual character, and the user may control the virtual character 2012 of the user to perform interaction such as chatting, friends addition, and "pat" on the recommended virtual character.

An interactive method of selecting an answer to a social question is to control a virtual character to move in a movement path corresponding to a candidate answer to the social question. Since controlling a virtual character to move is a continuous process rather than an instantaneous clicking/tapping behavior, misoperation can be effectively avoided.

Figure 3:
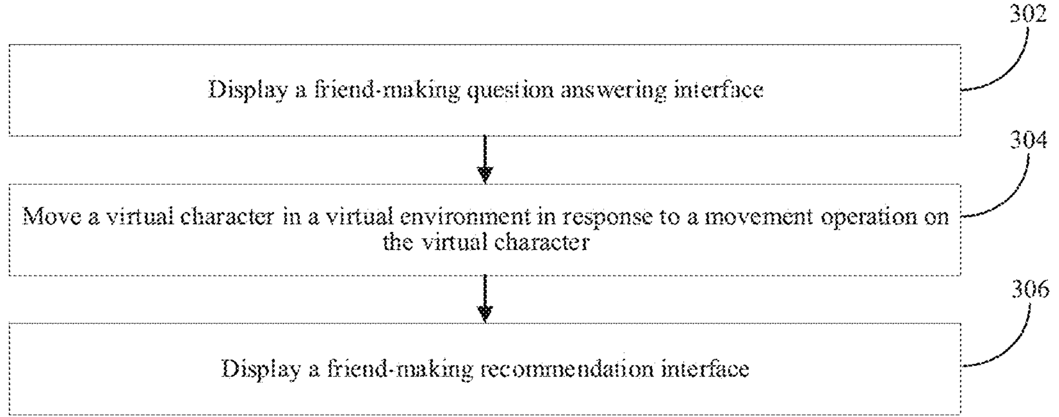
FIG. 3 is a schematic flowchart of a friend-making content recommendation method according to an embodiment of this application.

FIG. 3 is a schematic flowchart of a friend-making content recommendation method according to an embodiment of this application. The method may be applied to the terminal in FIG. 1 or the client on the terminal. As shown in FIG. 3, the method includes the following operations:

Operation 302: Display a friend-recommendation question answering interface.

The friend-recommendation question answering interface is configured to provide a user with a function of answering a friend-recommendation question, to recommend social-related content to the user based on an answer selected by the user to the friend-recommendation question. When the client receives a trigger operation requesting to enable a social function of answering questions, the client displays the friend-recommendation question answering interface.

The friend-recommendation question answering interface displays a virtual character of a first user account, a friend-recommendation question, and a plurality of movement paths in a virtual environment, and the plurality of movement paths are in one-to-one correspondence with a plurality of candidate answers to the friend-recommendation question.

In some embodiments, the movement path includes at least one of a road, a river, a bridge, or a pipeline, but is not limited thereto.

In some embodiments, the plurality of movement paths include at least one of a fork formed by a plurality of roads, a stream formed by a plurality of rivers, a plurality of bridges, or a plurality of pipelines, but are not limited thereto.

The first user account is a user account that logs in the client. The foregoing virtual environment may be a simulated environment of the real world, a semi-simulated and semi-fictional environment, or a completely fictional environment. The virtual environment may be any one of a two-dimensional virtual environment, a two-and-a-half-dimensional virtual environment, and a three-dimensional virtual environment, which is not limited in embodiments of this application. For example, the foregoing virtual environment is background in the friend-recommendation question answering interface. The virtual character is at least one movable object controlled by the user (the first user account) in the virtual environment. In some embodiments, the virtual character is a three-dimensional model created based on a skeletal animation technology. Each virtual character has a shape and a volume in the virtual environment, and occupies some space in the virtual environment.

The friend-recommendation question is a question for inquiring about features of a user, for example, inquiring about features such as personality, behaviors, and preferences of a user. The friend-recommendation question corresponds to a plurality of candidate answers, and each of the candidate answers can reflect a feature of the user. The friend-recommendation question and the plurality of candidate answers to the friend-recommendation question are pre-set by an operation personnel.

Each of the candidate answers to the friend-recommendation question corresponds to a movement path in the virtual environment. An example in which the movement path is a road, a fork formed by a plurality of roads, is used. For example, if there are three candidate answers to the friend-recommendation question, the client displays three forks in the virtual environment. If there are four candidate answers to the friend-recommendation question, the client displays four forks in the virtual environment. The forks are configured to simulate roads in the real world, and each of the forks has a starting point and an end point. For example, reference is still made to FIG. 2. There are two forks in the virtual environment, and the two forks has the same starting point and different end points. In some embodiments, each of the forks may be independent. In FIG. 2, the starting point of the fork is a point of the fork located at the bottom of the friend-recommendation question answering interface, and the end point of the fork is a point of the fork located at the top of the friend-recommendation question answering interface (where the points may be determined by referring to a perspective relationship, a near point is the starting point, and a far point is the end point). The virtual character is displayed near the starting point of the forks before moving. The display method of the foregoing forks and the explanation of the starting point and end point are only used as examples, and the client may alternatively display a plurality of forks in the virtual environment using other methods.

When displaying the friend-recommendation question answering interface, the client first determines a plurality of candidate answers to the friend-recommendation question, and then determines a plurality of to-be-displayed forks based on the determined quantity, to display the plurality of forks. The client stores display resources for different quantities of forks. When displaying different quantities of forks, the client acquires display resources for a determined quantity of forks to display a corresponding quantity of forks. In some embodiments, the foregoing display resources may alternatively be acquired by the client through a server.

In some embodiments, the client displays, around each of the forks, the candidate answer corresponding to the fork, to indicate the candidate answer corresponding to the fork. For example, reference is still made to FIG. 2. The client displays a virtual road sign next to each of the forks, and a candidate answer corresponding to the fork is displayed on the virtual road sign. When the client needs to display the friend-recommendation question answering interface, the client acquires one or more friend-recommendation questions and a plurality of candidate answers to each friend-recommendation question through the server.

Operation 304: Move the virtual character in the virtual environment in response to a movement operation on the virtual character.

The movement operation is triggered through a display screen of the terminal where the client is located, or through an external device such as a keyboard, a mouse, a joystick of the terminal where the client is located, and may alternatively be triggered through a voice instruction or an acceleration sensor.

In some embodiments, the movement operation on the virtual character includes but is not limited to at least one of the following manners:

triggering and controlling, by using a wheel control on the display screen, the virtual character to move;

controlling, by dragging the virtual character, the virtual character to move; or controlling, by sliding in a direction corresponding to a movement path, the virtual character to move in a sliding direction corresponding to the movement path.

The client may move, in response to the movement operation on the virtual character, the virtual character only in areas corresponding to the plurality of movement paths. In other words, a movement range of the virtual character is limited to the areas corresponding to the plurality of movement paths. Alternatively, the client may move the virtual character in a first area or a second area in the virtual environment. The first area is an area corresponding to the plurality of movement paths, and the second area is an area other than the first area in the virtual environment. In other words, the movement range of the virtual character includes the entire virtual environment.

In some embodiments, the friend-recommendation question answering interface corresponds to a plurality of friend-recommendation questions, and only one friend-recommendation question and a plurality of movement paths corresponding to the friend-recommendation question are displayed in the friend-recommendation question answering interface each time. For example, an $i^{th}$ friend-recommendation question among the plurality of friend-recommendation questions and a plurality of movement paths corresponding to the $i^{th}$ friend-recommendation question are displayed. The client displays, in response to the virtual character moving to an end point of a selected movement path among the plurality of movement paths corresponding to the $i^{th}$ friend-recommendation question, an $(i+1)^{th}$ friend-recommendation question and a plurality of movement paths corresponding to the $(i+1)^{th}$ friend-recommendation question in the friend-recommendation question answering interface. The client repeats the foregoing operations until the last friend-recommendation question is displayed.

In some embodiments, the client displays, in response to the virtual character moving to a display position of a next friend-recommendation question of the selected movement path among the plurality of movement paths corresponding to the $i^{th}$ friend-recommendation question, an $(i+1)^{th}$ friend-recommendation question and a plurality of movement paths corresponding to the $(i+1)^{th}$ friend-recommendation question in the friend-recommendation question answering interface. The client repeats the foregoing operations until the last friend-recommendation question is displayed.

In some embodiments, the display position of the next friend-recommendation question includes but is not limited to at least one of the following positions:

an end point position of a selected movement path;

a midpoint position of a selected movement path; or a position from a starting point of a selected movement path by a first distance.

An order of different friend-recommendation questions is determined by the client based on sequence numbers of the friend-recommendation questions when acquiring the friend-recommendation questions. The client may also display the sequence numbers of the friend-recommendation questions, in other words, a progress of answering the friend-recommendation questions, in the friend-recommendation question answering interface. For example, "⅕" in FIG. 2 indicates that a currently displayed friend-recommendation question is the first one of five friend-recommendation questions.

In some embodiments, the friend-recommendation question answering interface may alternatively be divided into a plurality of areas based on a plurality of friend-recommendation questions. Different areas are arranged based on a display direction of the friend-recommendation question answering interface. Each area displays a friend-recommendation question and a plurality of movement paths corresponding to the friend-recommendation question. In other words, a plurality of friend-recommendation questions and a plurality of movement paths corresponding to the plurality of friend-recommendation questions are both displayed in the friend-recommendation question answering interface. When the virtual character moves to an end point of a movement path in an $i^{th}$ area, the client displays the virtual character in an $(i+1)^{th}$ area to answer an $(i+1)^{th}$ question.

Operation 306: Display a friend-recommendation interface.

The friend-recommendation interface displays friend-recommendation content. For example, reference is still made to FIG. 2. The friend-recommendation content includes a recommended virtual character, and the recommended virtual character is a virtual character of another user account. The first user account may control the virtual character of the first user account to perform interaction such as chatting, friends addition, and "pat" on the recommended virtual character.

The friend-recommendation content is content recommended to the first user account based on a selected answer, and the selected answer is determined from the plurality of candidate answers based on the movement of the virtual character on a movement path selected from the plurality of movement paths. For example, when the virtual character moves to an end point of a specific movement path, the client determines a candidate answer corresponding to the movement path as a selected answer to a friend-recommendation question corresponding to the movement path, and sends the selected answer to the server.

The server recommends the friend-recommendation content to the first user account based on selected answers to different friend-recommendation questions. When the friend-recommendation question answering interface is configured for answering of a plurality of friend-recommendation questions, the friend-recommendation content is determined based on the selected answers to all of the friend-recommendation questions. For example, the server may determine user accounts that selects similar answers to the same plurality of friend-recommendation questions as the first user account, to determine the friend-recommendation content and send the friend-recommendation content to the client for display.

In conclusion, in the method provided in this embodiment, an interactive method of selecting an answer to a social question is to control a virtual character to move in a movement path corresponding to a candidate answer to the social question. A new selection method is provided, to combine a selection operation on a candidate answer to a friend-recommendation question with a virtual environment, so as to allow a user to be more immersed in a selection process of the candidate answer, thereby making transition between the selection process and a selection result smooth and natural and reducing a sense of separation.

Figure 4:
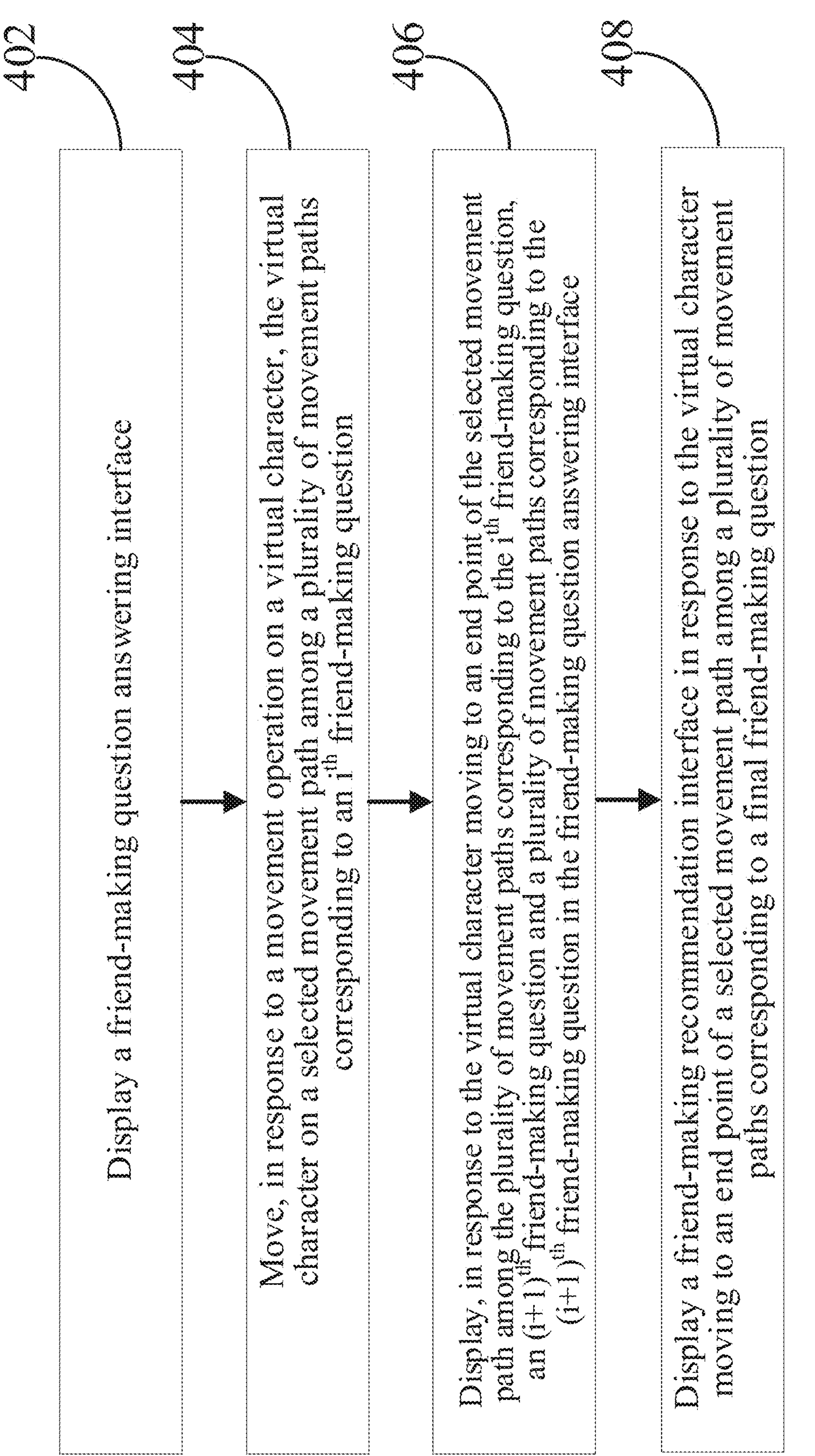
FIG. 4 is a schematic flowchart of a friend-making content recommendation method according to an embodiment of this application.

FIG. 4 is a schematic flowchart of a friend-making content recommendation method according to an embodiment of this application. The method may be applied to the terminal in FIG. 1 or the client on the terminal. As shown in FIG. 4, the method includes the following operations:

Operation 402: Display a friend-recommendation question answering interface.

The friend-recommendation question answering interface is configured to provide a user with a function of answering a friend-recommendation question. When the client receives a trigger operation requesting to enable a social function of answering questions, the client displays the friend-recommendation question answering interface. The friend-recommendation question answering interface displays a virtual character of a first user account, a friend-recommendation question, and a plurality of movement paths in a virtual environment, and the plurality of movement paths are in one-to-one correspondence with a plurality of candidate answers to the friend-recommendation question.

In some embodiments, the friend-recommendation question answering interface corresponds to a plurality of friend-recommendation questions. In other words, the friend-recommendation question answering interface is configured for the user to answer the plurality of friend-recommendation questions. The friend-recommendation question answering interface displays an $i^{th}$ friend-recommendation question among the plurality of friend-recommendation questions and a plurality of movement paths corresponding to the $i^{th}$ friend-recommendation question, and i a positive integer. In some embodiments, the client alternatively displays, around each of the movement paths, the candidate answer corresponding to the movement path.

Operation 404: Move, in response to a movement operation on the virtual character, the virtual character on a selected movement path among the plurality of movement paths corresponding to the $i^{th}$ friend-recommendation question.

The client moves the virtual character in a first area or a second area in the virtual environment in response to the movement operation on the virtual character. The first area is an area corresponding to the plurality of movement paths, and the second area is an area other than the first area in the virtual environment. In other words, a movement range of the virtual character includes the entire virtual environment. In some embodiments, the client may alternatively move the virtual character only in areas corresponding to the plurality of movement paths.

The virtual character moving on the selected movement path among the plurality of movement paths corresponding to the $i^{th}$ friend-recommendation question is implemented by the first user account controlling the virtual character. The virtual character moving on the selected movement path among the plurality of movement paths corresponding to the $i^{th}$ friend-recommendation question may indicate that the first user account may select a candidate answer corresponding to the movement path as a selected answer to the $i^{th}$ friend-recommendation question.

When the virtual character moves on one of the plurality of movement paths in the virtual environment, the client may display prompt information around the movement path. Specifically, the displaying of the prompt information includes at least one of the following:

1. The client displays, in response to the virtual character moving on a selected movement path among the plurality of movement paths, a plurality of second user accounts around the selected movement path. The second user account is a user account that selects a candidate answer corresponding to the selected movement path. In other words, the second user account is a user account that answers the friend-recommendation question corresponding to the selected movement path in the server and selects, for the friend-recommendation question, the candidate answer corresponding to the selected movement path as a selected answer.

Figures 5, 6:
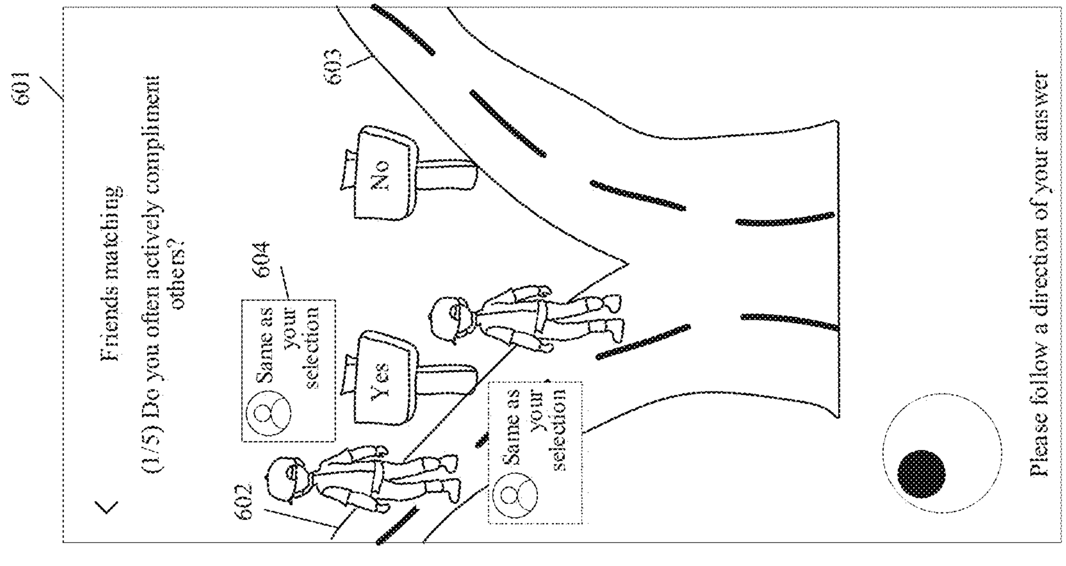
FIG. 5 is a schematic diagram of a friend-recommendation question answering interface according to an exemplary embodiment of this application.
FIG. 6 is a schematic diagram of a friend-recommendation question answering interface according to an exemplary embodiment of this application.

For example, FIG. 5 is a schematic diagram of a friend-recommendation question answering interface according to an exemplary embodiment of this application. As shown in FIG. 5, a movement path 502 and a movement path 503 corresponding to a friend-recommendation question are displayed in a friend-recommendation question answering interface 501. When a virtual character moves on the movement path 502, the client displays prompt information 504 next to the movement path 502. The prompt information 504 shows a plurality of user accounts that select an answer "yes" to the friend-recommendation question "do you often actively compliment others".

2. The client displays, in response to the virtual character moving on a selected movement path among the plurality of movement paths, an avatar of a second user account around the selected movement path. The second user account is a user account that selects a candidate answer corresponding to the selected movement path. In other words, the second user account is a user account that answers the friend-recommendation question corresponding to the selected movement path in the server and selects, for the friend-recommendation question, the candidate answer corresponding to the selected movement path as a selected answer. The second user account includes one or more of a plurality of user accounts that satisfy the foregoing conditions. Transparency of the displayed avatar of the second user account displayed by the client is negatively correlated with a moving progress of the virtual character, and the moving progress of the virtual character is configured for reflecting a progress of the virtual character moving from a starting point of the selected movement path to an end point of the selected movement path. To be specific, a greater moving progress of the virtual character indicates a closer distance from the end point of the movement path and lower transparency of the avatar of the second user account. A smaller moving progress of the virtual character indicates a closer distance from the starting point of the movement path and higher transparency of the avatar of the second user account.

For example, FIG. 6 is a schematic diagram of a friend-recommendation question answering interface according to an exemplary embodiment of this application. As shown in FIG. 6, a movement path 602 and a movement path 603 corresponding to a friend-recommendation question are displayed in a friend-recommendation question answering interface 601. When a virtual character moves on the movement path 602, the client displays prompt information 604 next to the movement path 602. The prompt information 604 shows avatars of user accounts that select an answer "yes" to the friend-recommendation question "do you often actively compliment others". In addition, transparency of the prompt information 604 displayed when the virtual character is in a first position is greater than transparency of the prompt information 604 displayed when the virtual character is in a second position. The first position and the second position are both on the movement path 602, and the second position is closer to an end point of the movement path 602 than the first position.

3. The client displays, in response to the virtual character moving on a selected movement path among the plurality of movement paths, predicted recommendation information around the selected movement path when a movement distance on the selected movement path satisfies a distance threshold. The movement distance is configured for reflecting a progress of the virtual character moving from a starting point of the selected movement path to an end point of the selected movement path. The movement distance is determined based on a distance between a current position of the virtual character on the selected movement path and the starting point of the selected movement path, and the distance threshold is set by the client. The predicted recommendation information is configured for predicting at least one of a quantity, an area ratio, a gender ratio, an age ratio, or an activeness ratio of user accounts recommended to a user account when the user account selects a candidate answer corresponding to the selected movement path. The user accounts recommended to the user account are user accounts that select the candidate answer corresponding to the selected movement path. In other words, the user accounts recommended to the user account are user accounts that answer the friend-recommendation question corresponding to the selected movement path in the server and select, for the friend-recommendation question, the candidate answer corresponding to the selected movement path as a selected answer.

Figure 7:
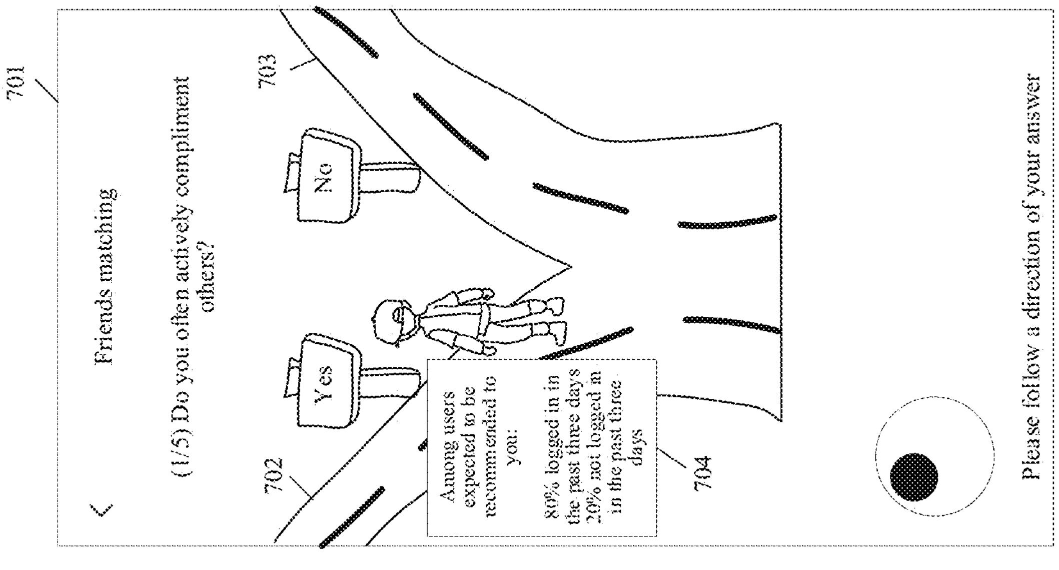
FIG. 7 is a schematic diagram of a friend-recommendation question answering interface according to an exemplary embodiment of this application.

For example, FIG. 7 is a schematic diagram of a friend-recommendation question answering interface according to an exemplary embodiment of this application. As shown in FIG. 7, a movement path 702 and a movement path 703 corresponding to a friend-recommendation question are displayed in a friend-recommendation question answering interface 701. When a virtual character moves on the movement path 702 and a movement distance from a starting point of the movement path 702 meets a distance threshold (for example, half a length of the movement path 702), the client displays prompt information 704 next to the movement path 702. The prompt information 704 shows, when the first user account selects an answer "yes" to the friend-recommendation question "do you often actively compliment others", a ratio of user accounts that logged in in the past three days to user accounts that have not log in in the past three days among user accounts recommended by the server to the first user account.

In some embodiments, the plurality of movement paths include a first movement path and a second movement path. The movement of the virtual character is displayed in a first motion form in response to the virtual character moving on the first movement path. The movement of the virtual character is displayed in a second motion form in response to the virtual character moving on the second movement path. The first motion form is different from the second motion form. In some embodiments, movement postures (slow walking, fast walking, running, jumping, and the like) and/or movement speed are different in the first motion form and the second motion form.

The plurality of movement paths may alternatively include more movement paths. For the movement of the virtual character in each of the plurality of movement paths, the client displays the movement in different motion forms. In some embodiments, when the virtual character moves on each of the plurality of movement paths, the client may alternatively mark the virtual character using different marking methods, so that the user can distinguish the movement of the virtual character moving on different movement paths. For example, the virtual character is displayed using frames of different colors, the virtual character is marked using different clothing colors, or the virtual character is displayed using different clothes to display and mark the virtual character.

In some embodiments, when displaying the friend-recommendation question answering interface, the client may alternatively display a movement path mark on a predicted movement path among the plurality of movement paths displayed in the friend-recommendation question answering interface. The movement path mark is configured to mark the predicted movement path, for example, an arrow displayed on the predicted movement path, and a direction of the arrow is a direction from a starting point of the predicted movement path to an end point of the predicted movement path. The predicted movement path is determined by the server by predicting answers that the first user account may select for the friend-recommendation question corresponding to the plurality of movement paths. In other words, the determined predicted movement path is a movement path among the plurality of movement paths that corresponds to a predicted answer that the first user account may select for the friend-recommendation question. When determining the predicted answer, the server acquires attribute data of the first user account and/or behavior data in the client. For example, the behavior data includes interaction data between the first user account and another user account in the server, information queried by the first user account through the client, operation data of the first user account in the client, and the like. The server inputs the attribute data and/or behavior data of the first user account, the friend-recommendation question corresponding to the plurality of movement paths, and the plurality of candidate answers to the friend-recommendation question into a machine learning model, to obtain a predicted answer predicted by the machine learning model from the plurality of candidate answers, and sends the predicted answer to the client. The client may determine a corresponding predicted movement path from the plurality of movement paths based on the predicted answer. The machine learning model is obtained by the server through training attribute data and/or behavior data of a sample user account, a sample friend-recommendation question and a plurality of candidate answers to the sample friend-recommendation question, and an answer selected by the sample user account from the plurality of candidate answers to the sample friend-recommendation question.

Figure 8:
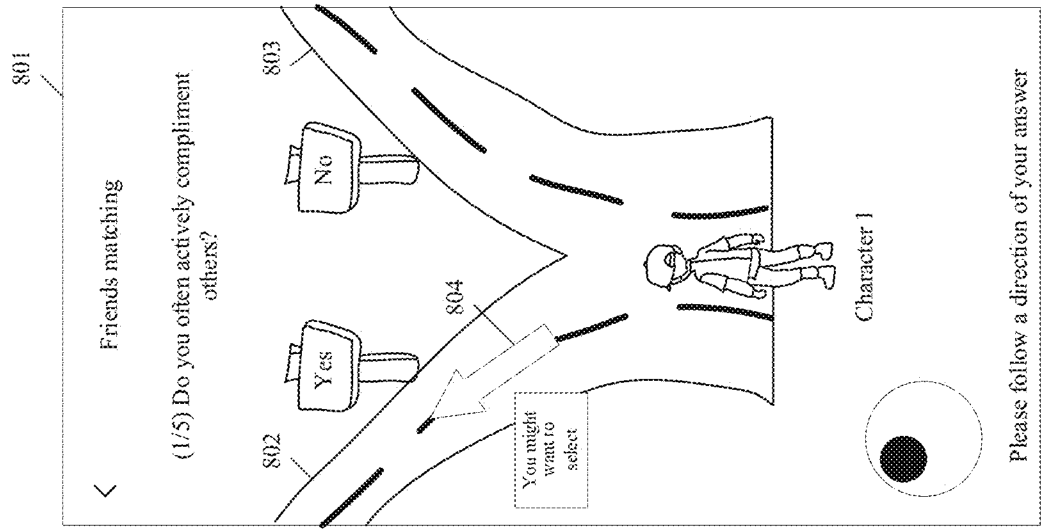
FIG. 8 is a schematic diagram of a friend-recommendation question answering interface according to an exemplary embodiment of this application.

For example, FIG. 8 is a schematic diagram of a friend-recommendation question answering interface according to an exemplary embodiment of this application. As shown in FIG. 8, a movement path 802 and a movement path 803 corresponding to a friend-recommendation question are displayed in a friend-recommendation question answering interface 801. When displaying the friend-recommendation question answering interface 801, the client also displays a movement path mark 804 on the movement path 802. The movement path mark 804 is an arrow pointing from a starting point to an end point of the movement path 802. Prompt information is also displayed next to the movement path mark 804. The movement path 802 is a movement path corresponding to a predicted answer "yes" that is predicted by the server and that the first user account may select for the friend-recommendation question "do you often actively compliment others". Predicted answers that the user may select for friend-recommendation questions are predicted, and movement paths corresponding to the predicted answers are marked, so that operation behavior of a user can be guided, thereby helping the user make a quick decision on answer selection of the friend-recommendation questions.

Operation 406: Display, in response to the virtual character moving to an end point of the selected movement path among the plurality of movement paths corresponding to the $i^{th}$ friend-recommendation question, an $(i+1)^{th}$ friend-recommendation question and a plurality of movement paths corresponding to the $(i+1)^{th}$ friend-recommendation question in the friend-recommendation question answering interface.

In some embodiments, the client determines, in response to the virtual character moving to the end point of the selected movement path among the plurality of movement paths corresponding to the $i^{th}$ friend-recommendation question, a candidate answer corresponding to the selected movement path as a selected answer to the $i^{th}$ friend-recommendation question. Friend-making recommendation content recommended by the client to the first user account in operation 408 is determined based on selected answers to all of the friend-recommendation questions.

In some embodiments, the client displays, in response to the virtual character moving to a display position of a next friend-recommendation question of the selected movement path among the plurality of movement paths corresponding to the $i^{th}$ friend-recommendation question, an $(i+1)^{th}$ friend-recommendation question and a plurality of movement paths corresponding to the $(i+1)^{th}$ friend-recommendation question in the friend-recommendation question answering interface.

For example, the virtual character automatically moves, in response to controlling the virtual character to move to an automatic movement position on the plurality of movement paths corresponding to the $i^{th}$ friend-recommendation question, to a display position of a next friend-recommendation question of the selected movement path among the plurality of movement paths corresponding to the $i^{th}$ friend-recommendation question.

The automatic movement position is configured for indicating that after the virtual character moves to the position, the virtual character automatically moves without the movement operation on the virtual character until the virtual character arrives at the end point of the selected movement path or the display position of the next friend-recommendation question.

In some embodiments, the automatic movement position includes but is not limited to at least one of the following positions:

- a midpoint position of a selected movement path among the plurality of movement paths; or
- a position from a starting point of a selected movement path among the plurality of movement paths by a second distance.

An example in which the display position of the next friend-recommendation question is the end point of the selected movement path is used. The virtual character automatically moves, in response to controlling the virtual character to move to the automatic movement position on the plurality of movement paths corresponding to the $i^{th}$ friend-recommendation question, to the end point of the selected movement path among the plurality of movement paths corresponding to the $i^{th}$ friend-recommendation question.

Operation 408: Display the friend-recommendation interface in response to the virtual character moving to an end point of a selected movement path among a plurality of movement paths corresponding to a final friend-recommendation question.

The final friend-recommendation question is the last friend-recommendation question among the plurality of friend-recommendation questions corresponding to the friend-recommendation question answering interface. In other words, after the first user account answers all of the friend-recommendation questions, the client displays the friend-recommendation interface. The friend-recommendation interface displays friend-recommendation content.

In some embodiments, the friend-recommendation interface is displayed in response to the virtual character moving to a display position of the friend-recommendation interface of the selected movement path among the plurality of movement paths corresponding to the final friend-recommendation question.

In some embodiments, the display position of the friend-recommendation interface includes but is not limited to at least one of the following positions:

- an end point position of a selected movement path among the plurality of movement paths corresponding to the final friend-recommendation question;
- a midpoint position of a selected movement path among the plurality of movement paths corresponding to the final friend-recommendation question; or
- a position from a starting point of a selected movement path among the plurality of movement paths corresponding to the final friend-recommendation question by a third distance.

The friend-recommendation content is content recommended to the first user account based on a selected answer, and the selected answer is determined from the plurality of candidate answers based on the movement of the virtual character on a movement path selected from the plurality of movement paths. Specifically, when the virtual character moves to an end point of a specific movement path, the client determines a candidate answer corresponding to the movement path as a selected answer to a friend-recommendation question corresponding to the movement path, and sends the selected answer to the server. The server recommends the friend-recommendation content to the first user account based on selected answers to different friend-recommendation questions. When the friend-recommendation question answering interface is configured for answering of a plurality of friend-recommendation questions, the friend-recommendation content is determined based on the selected answers to all of the friend-recommendation questions. For example, the server may determine recommended user accounts that selects similar answers to the same plurality of friend-recommendation questions as the first user account, to determine the friend-recommendation content and send the friend-recommendation content to the client for display.

For example, when a repetition rate of selected answers selected by the recommended user accounts and the first user account in the server for the same plurality of friend-recommendation questions is greater than a repetition rate threshold, the server determines the friend-recommendation content based on the recommended user accounts.

In some embodiments, the friend-recommendation interface displayed by the client includes at least one of the following information:

- a recommended virtual character;
- a virtual building of the recommended virtual character; or
- a group of a plurality of recommended virtual characters.

The recommended virtual character is a virtual character of the recommended user account determined by the server. The virtual building of the recommended virtual character may be referred to as a recommended nest. The virtual building is configured to simulate a real building. The virtual building of the recommended virtual character is maintained by the recommended user account. The group of a plurality of recommended virtual characters is a group including virtual characters of a plurality of recommended user accounts. In some embodiments, during displaying, the client displays the group in a tent style. In some embodiments, when displaying the virtual character, the client alternatively displays a name of the virtual character.

In some embodiments, the first user account may interact with the foregoing friend-recommendation content displayed in the friend-recommendation interface by controlling the virtual character of the first user account. For example, when the first user account clicks/taps the recommended virtual character, the client displays a chat button. In this case, the first user account can start chatting with the recommended user account. When the first user account double-clicks/double-taps the recommended virtual character, the client displays interactive information such as "patting" the recommended virtual character. In this case, the recommended user account receives a pat notification. When the first user account clicks/taps the recommended virtual character, the client may alternatively display a follow button to follow the recommended virtual account. Alternatively, when the first user account clicks/taps the recommended virtual character, the client displays a button to trigger the virtual character of the first user account to enter a nest of the virtual character of the recommended user account. When the first user account clicks/taps the recommended virtual character, the client may alternatively display a button to enable the virtual character of the first user account to try on the same clothes and the like as the virtual character of the recommended user account.

Figure 9:
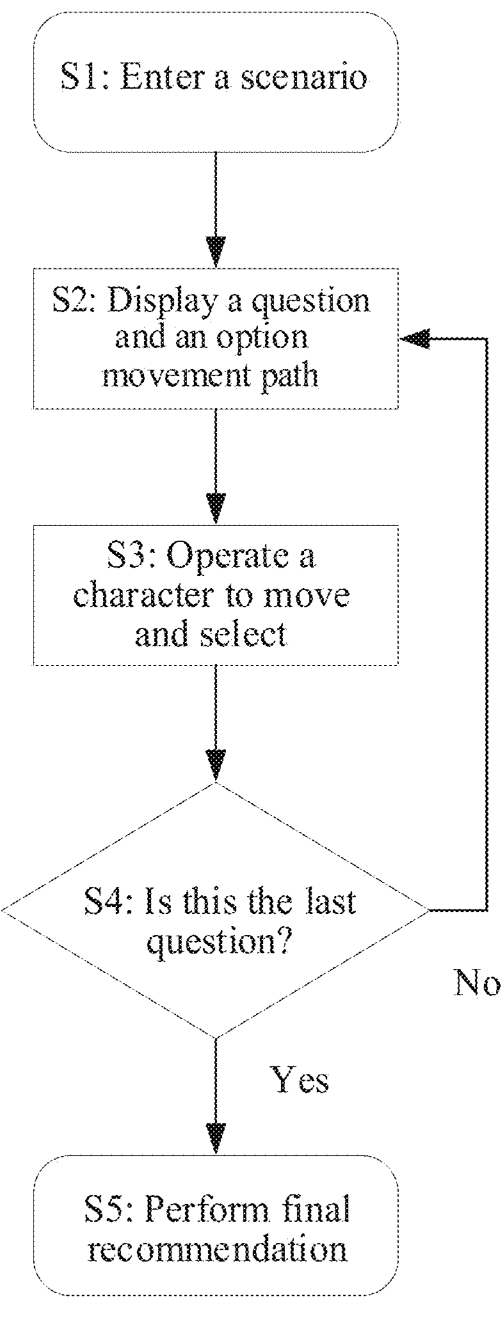
FIG. 9 is an operation flowchart of socializing based on a friend-recommendation question according to an exemplary embodiment of this application.

In a specific example, FIG. 9 is an operation flowchart of socializing based on a friend-recommendation question according to an exemplary embodiment of this application. As shown in FIG. 9, in operation S1, a virtual character of a user enters a scenario (in other words, a friend-recommendation question answering interface is displayed). In, operation S2, a client displays a friend-recommendation question to the user, and displays, based on candidate answers to the question, movement paths for selection. There is a road sign on each of the movement paths to display a corresponding candidate answer. In operation S3, the user controls the virtual character to move and select a movement path. The virtual character arriving at the end (an end point) of the movement path indicates that an answer corresponding to the movement path is selected. In operation S4, after an answer to a friend-recommendation question is selected, the client enters a scenario of a next friend-recommendation question until all of the friend-recommendation questions are answered. In operation S5, when all of the friend-recommendation questions are answered, the movement path displayed by the client directs to a final content scenario (that is, a friend-recommendation interface). The client displays content recommended to the user in the content scenario based on the answers to the foregoing questions.

Figure 10:
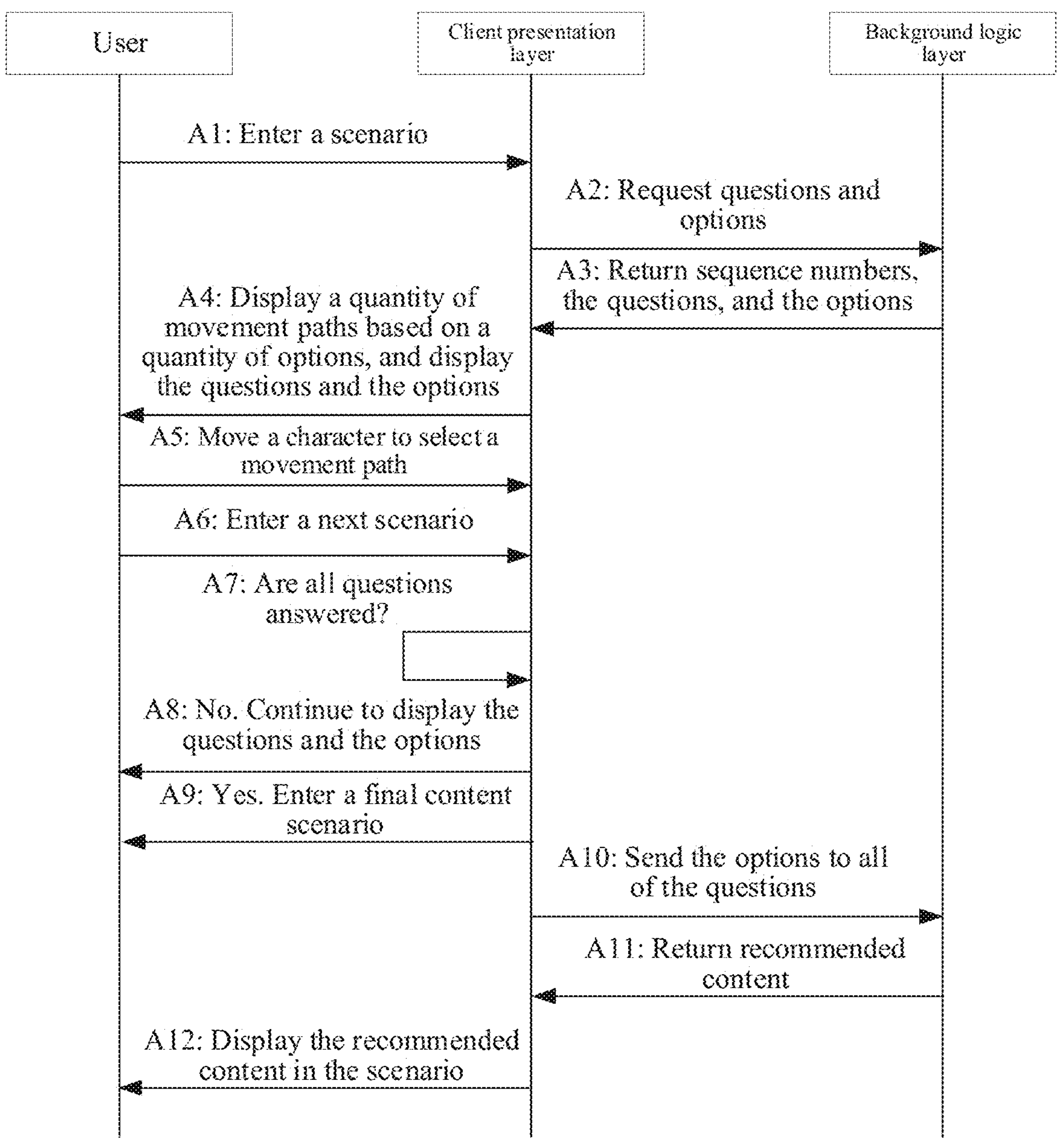
FIG. 10 is a flowchart of an interaction process between foreground and background according to an exemplary embodiment of this application.

In a specific example, FIG. 10 is a flowchart of an interaction process between foreground and background according to an exemplary embodiment of this application. As shown in FIG. 10, in operation A1, a user triggers display of a friend-recommendation question answering interface of a client. In operation A2, the client requests friend-recommendation questions and candidate answers from a server. In operation A3, the server returns a plurality of friend-recommendation questions, a plurality of candidate answers to the friend-recommendation questions, and sequence numbers of the friend-recommendation questions to the client. In operation A4, the client displays a corresponding quantity of movement paths in a virtual environment based on a plurality of candidate answers to the friend-recommendation questions, and displays the friend-recommendation questions and the candidate answers. In operation A5, the user controls a virtual character to select a movement path and move on the movement path. In operation A6, when the virtual character moves to an end point of the movement path, that is, after an answer to the friend-recommendation question is selected, the client displays a next friend-recommendation question and corresponding movement paths. In operation A7, each time a next friend-recommendation question is switched to be displayed, the client determines whether the user answers the last friend-recommendation question. In operation A8, if the user does not answer all of the friend-recommendation questions, the operation of answering the friend-recommendation questions continues to be performed. In operation A9, if the user answers all of the friend-recommendation questions, the client displays a friend-recommendation interface. In operation A10, the client sends selected answers to all of the friend-recommendation questions to the server. In operation A11, the server determines, based on the selected answers to all of the friend-recommendation questions, friend-recommendation content recommended to the user. In operation A12, the client displays the friend-recommendation interface and displays the friend-recommendation content in the friend-recommendation interface.

According to the foregoing solutions in embodiments of this application, recommendation and a virtual world are combined to provide a user with an immersive answer selection method that is more in line with the virtual world. After the user completes selection, the user directly enters desired scenario space. The experience is smooth and natural, and the user does not have a sense of separation or psychological aversion. The foregoing solutions provide a method for recommending content to the user in a virtual scene. The method is more immersive and gives the user more relaxing and fun experience. The user completes selection during a game, and the process is easy and fun, which is easier for the user to accept than a monotonous method of displaying a question and clicking/tapping an answer for selection. In addition, a process of entering a recommended scenario is natural and smooth, providing smooth and consistent experience.

In conclusion, in the method provided in this embodiment, an interactive method of selecting an answer to a social question is to control a virtual character to move in a movement path corresponding to a candidate answer to the social question. A new selection method is provided, to combine a selection operation on a candidate answer to a friend-recommendation question with a virtual environment, so as to allow a user to be more immersed in a selection process of the candidate answer, thereby making transition between the selection process and a selection result smooth and natural and reducing a sense of separation. In addition, since controlling a virtual character to move is a continuous process rather than an instantaneous clicking/tapping behavior, misoperation can be effectively avoided.

In addition, according to the method provided in this embodiment, a next friend-recommendation question and a plurality of corresponding movement paths are displayed after a virtual character moves to an end point of a selected movement path corresponding to a friend-recommendation question, to switch displayed content, so as to enable a user to answer a plurality of friend-recommendation questions.

In addition, according to the method provided in this embodiment, a friend-recommendation interface is displayed after a virtual character moves to an end point of a selected movement path corresponding to the last friend-recommendation question, so that after a user answers all of friend-recommendation questions, friend-recommendation content can be recommended to the user.

In addition, according to the method provided in this embodiment, when a virtual character moves to an end point of a selected movement path, a candidate answer corresponding to the movement path is determined as an answer selected by a user, and an interesting interactive method of selecting an answer to a friend-recommendation question by controlling the virtual character to move on the movement path is provided.

In addition, according to the method provided in this embodiment, a virtual character is supported to move in a movement path area and a non-movement path area in a virtual environment, so that a user can control the virtual character to move freely in the virtual environment, thereby improving user experience of controlling the virtual character.

In addition, according to the method provided in this embodiment, candidate answers corresponding to a movement path are displayed around the movement path, so that when a virtual character moves on the movement path, a user is prompted for an answer selected by the user, thereby improving user experience.

In addition, according to the method provided in this embodiment, a variety of friend-recommendation content is displayed on a friend-recommendation interface, so that rich content can be recommended to a user based on answers to friend-recommendation questions selected by the user, thereby improving user experience.

In addition, according to the method provided in this embodiment, a plurality of second user accounts is displayed when a user controls a virtual character to move on a movement path, so that the user can pre-know a plurality of user accounts recommended to the user based on answers selected by the user, thereby helping the user make a decision on answer selection of friend-recommendation questions.

In addition, according to the method provided in this embodiment, an avatar of a second user account is displayed when a user controls a virtual character to move on a movement path, so that the user can pre-know an avatar of a user account recommended to the user based on answers selected by the user, thereby helping the user make a decision on answer selection of friend-recommendation questions. In addition, transparency of the displayed avatar changes as the virtual character moves, to give the user a prompt and avoid displayed information interfering with the user.

In addition, according to the method provided in this embodiment, predicted recommendation information is displayed when a user controls a virtual character to move on a movement path, so that the user can pre-know information included in friend-recommendation content recommended to the user based on answers selected by the user, thereby helping the user make a decision on answer selection of friend-recommendation questions.

In addition, according to the method provided in this embodiment, movement of a virtual character is displayed in different motion forms when the virtual character moves on different movement paths, to prompt a user, through the motion forms of the virtual character, to select different answers to friend-recommendation questions, so that misoperation of the user can be avoided.

A sequence of the operations of the method provided in embodiments of this application may be appropriately adjusted, and the operations may also be correspondingly added or deleted based on a situation. All variant methods readily figured out by a person skilled in the art within the technical scope disclosed in this application shall fall within the protection scope of this application, and therefore are not described in detail.

In this application, a prompt interface and a pop-up window may be displayed or voice prompt information may be outputted before and during relevant data of a user is collected. The prompt interface, the pop-up window, or the voice prompt information are configured for prompting the user that relevant data is collected currently. In this way, in this application, only after a confirmation operation performed by the user on the prompt interface, the pop-up window, or the voice prompt information is acquired, a relevant operation of acquiring the relevant data of the user starts, or otherwise (that is, when the confirmation operation performed by the user on the prompt interface, the pop-up window, or the voice prompt information is not acquired), the relevant operation of the relevant data of the user ends, that is, the relevant data of the user is not acquired. In other words, in this application, all collected user data are collected with the consent and authorization of users. The collection, use, and processing of relevant user data need to comply with the relevant laws, regulations, and standards of relevant countries and regions.

Figure 11:
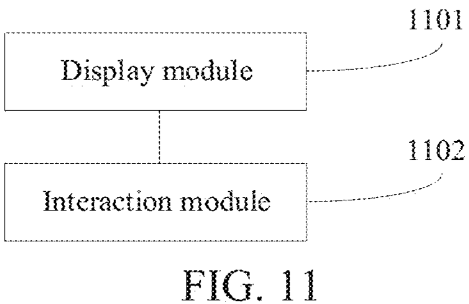
FIG. 11 is a schematic diagram of a structure of a friend-making content recommendation apparatus according to an exemplary embodiment of this application.

FIG. 11 is a schematic diagram of a structure of a friend-making content recommendation apparatus according to an exemplary embodiment of this application. As shown in FIG. 11, the apparatus includes:

a display module 1101, configured to perform operation 302 in FIG. 3; and an interaction module 1102, configured to perform operation 304 in FIG. 3.

The first display module 1101 is configured to perform operation 306 in FIG. 3.

In an exemplary design, the interaction module 1102 is configured to perform operation 406 in FIG. 4.

In an exemplary design, the display module 1101 is configured to perform operation 408 in FIG. 4.

Figure 12:
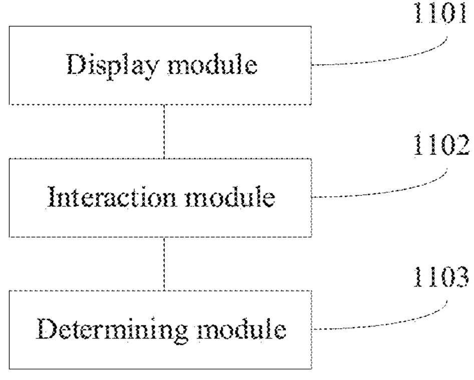
FIG. 12 is a schematic diagram of a structure of a friend-making content recommendation apparatus according to an exemplary embodiment of this application.

In an exemplary design, as shown in FIG. 12, the apparatus further includes:

a determining module 1103, configured to determine, in response to a virtual character moving to an end point of a selected movement path among a plurality of movement paths corresponding to an $i^{th}$ friend-recommendation question, a candidate answer corresponding to the selected movement path as a selected answer to the $i^{th}$ friend-recommendation question.

Friend-making recommendation content is determined based on selected answers to all of friend-recommendation questions.

In an exemplary design, the interaction module 1102 is configured to:

move the virtual character in a first area or a second area in a virtual environment in response to a movement operation on the virtual character.

The first area is an area corresponding to the plurality of movement paths, and the second area is an area other than the first area in the virtual environment.

In an exemplary design, the display module 1101 is configured to:

display, around each of the movement paths, a candidate answer corresponding to the movement path.

In an exemplary design, the display module 1101 is configured to:

display a friend-recommendation interface, the friend-recommendation interface including at least one of the following information:

a recommended virtual character;

a virtual building of the recommended virtual character; or a group of a plurality of recommended virtual characters.

In an exemplary design, the display module 1101 is configured to:

display, in response to the virtual character moving on a selected movement path among the plurality of movement paths, a plurality of second user accounts around the selected movement path.

The second user account is a user account that selects a candidate answer corresponding to the selected movement path.

In an exemplary design, the display module 1101 is configured to:

display, in response to the virtual character moving on a selected movement path among the plurality of movement paths, an avatar of a second user account around the selected movement path.

The second user account is a user account that selects a candidate answer corresponding to the selected movement path. Transparency of the displayed avatar of the second user account is negatively correlated with a moving progress of the virtual character. The moving progress of the virtual character is configured for reflecting a progress of the virtual character moving from a starting point of the selected movement path to an end point of the selected movement path.

In an exemplary design, the display module 1101 is configured to:

display, in response to the virtual character moving on a selected movement path among the plurality of movement paths, predicted recommendation information around the selected movement path when a movement distance on the selected movement path satisfies a distance threshold.

The predicted recommendation information is configured for predicting at least one of a quantity, an area ratio, a gender ratio, an age ratio, or an activeness ratio of user accounts recommended to a user account when the user account selects a candidate answer corresponding to the selected movement path.

In an exemplary design, the plurality of movement paths include a first movement path and a second movement path. The display module 1101 is configured to:

display, in response to the virtual character moving on the first movement path, the movement of the virtual character in a first motion form; and display, in response to the virtual character moving on the second movement path, the movement of the virtual character in a second motion form.

The first motion form is different from the second motion form.

The term "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module can be implemented using one or more processors (or processors and memory). Likewise, a processor (or processors and memory) can be used to implement one or more modules. Moreover, each module can be part of an overall module that includes the functionalities of the module. Division of the functional modules of the friend-making content recommendation apparatus provided in the foregoing embodiments is merely described as an example. In actual application, the foregoing functions may be assigned according to needs to be implemented by different functional modules, that is, an internal structure of the device is divided into different functional modules, to implement all or a part of the functions described above. In addition, the friend-making content recommendation apparatus provided in the foregoing embodiments and the friend-making content recommendation method embodiments fall within the same conception. For details of a specific implementation process, reference may be made to the method embodiments. Details are not described herein again.

An embodiment of this application further provides a computer device. The computer device includes: a processor and a memory. The memory has at least one instruction, at least one program, and a code set or an instruction set stored therein, and the at least one instruction, the at least one program, and the code set or the instruction set are loaded and executed by the processor to implement the friend-making content recommendation method according to the foregoing method embodiments.

Figure 13:
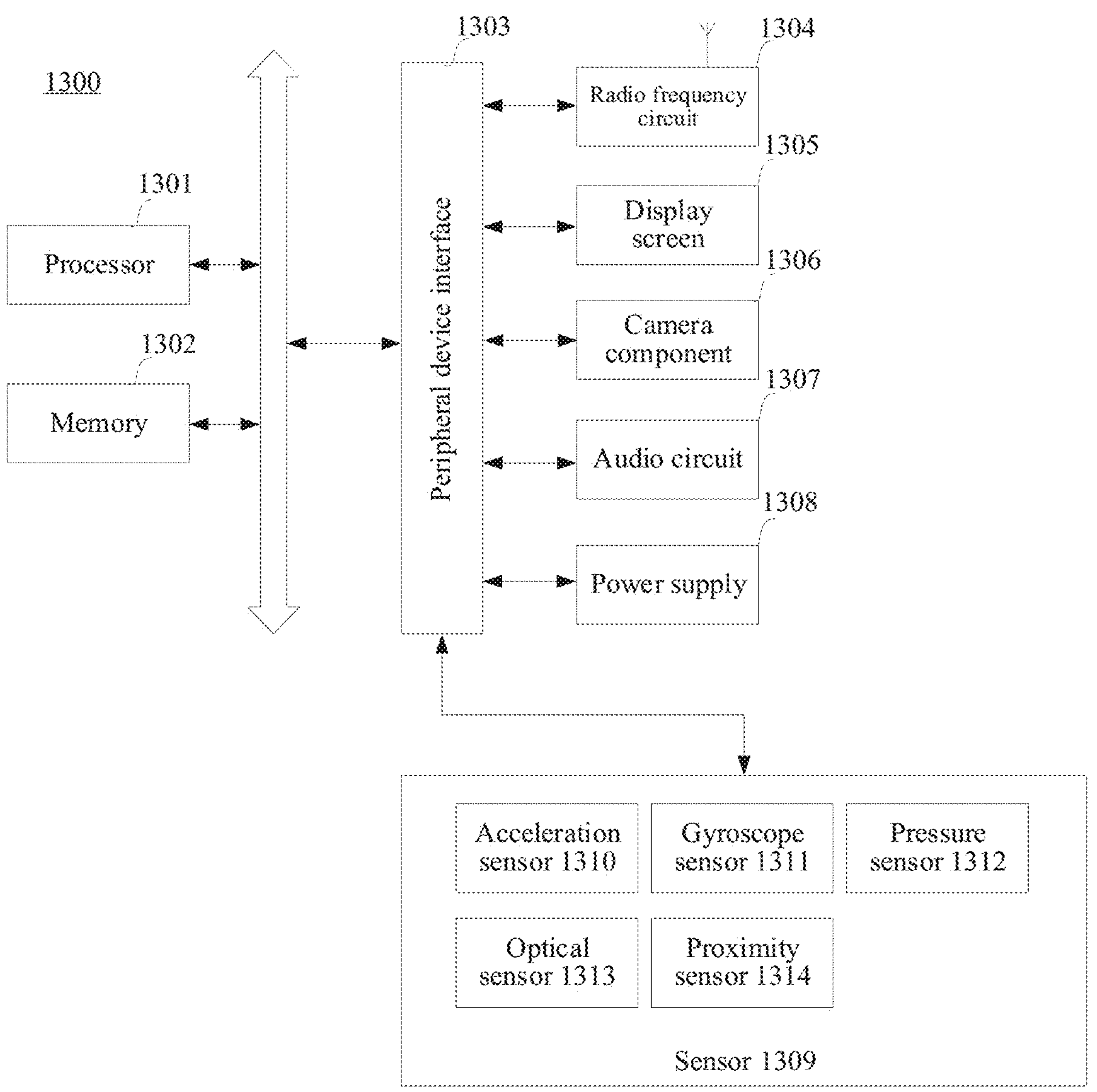
FIG. 13 is a schematic diagram of a structure of a terminal according to an exemplary embodiment of this application.

For example, FIG. 13 is a schematic diagram of a structure of a terminal according to an exemplary embodiment of this application.

The terminal 1300 generally includes: a processor 1301 and a memory 1302.

The processor 1301 may include one or more processing cores, for example, a 4-core processor or an 8-core processor. The processor 1301 may be implemented in at least one hardware form of a digital signal processor (DSP), a field-programmable gate array (FPGA), or a programmable logic array (PLA). The processor 1301 may alternatively include a main processor and a coprocessor. The main processor is a processor configured to process data in an awake state, and is also referred to as a central processing unit (CPU). The coprocessor is a low power consumption processor configured to process the data in a standby state. In some embodiments, the processor 1301 may be integrated with a graphics processing unit (GPU). The GPU is configured to render and draw content that needs to be displayed on a display screen. In some embodiments, the processor 1301 may further include an artificial intelligence (AI) processor. The AI processor is configured to process computing operations related to machine learning.

The memory 1302 may include one or more computer-readable storage media. The computer-readable storage medium may be non-transitory. The memory 1302 may further include a high-speed random access memory and a nonvolatile memory, for example, one or more disk storage devices or flash storage devices. In some embodiments, the non-transitory computer-readable storage medium in the memory 1302 is configured to store at least one instruction, and the at least one instruction is configured for being executed by the processor 1301 to implement the friend-making content recommendation method provided in the method embodiments of this application.

In some embodiments, the terminal 1300 may alternatively include: a peripheral device interface 1303 and at least one peripheral device. The processor 1301, the memory 1302, and the peripheral device interface 1303 may be connected through a bus or a signal cable. Each peripheral device may be connected to the peripheral device interface 1303 through a bus, a signal cable, or a circuit board. Specifically, the peripheral device includes: at least one of a radio frequency circuit 1304, a display screen 1305, a camera component 1306, an audio circuit 1307, or a power supply 1308.

The peripheral device interface 1303 may be configured to connect the at least one peripheral device related to input/output (I/O) to the processor 1301 and the memory 1302. In some embodiments, the processor 1301, the memory 1302, and the peripheral device interface 1303 are integrated on the same chip or circuit board. In some other embodiments, any one or two of the processor 1301, the memory 1302, and the peripheral device interface 1303 may be implemented on a single chip or circuit board, which is not limited in embodiments of this application.

The radio frequency circuit 1304 is configured to receive and transmit a radio frequency (RF) signal, which is also referred to as an electromagnetic signal. The radio frequency circuit 1304 communicates with a communication network and other communication devices through the electromagnetic signal. The radio frequency circuit 1304 converts an electric signal into an electromagnetic signal for transmission, or converts a received electromagnetic signal into an electric signal. In some embodiments, the radio frequency circuit 1304 includes an antenna system, an RF transceiver, one or more amplifiers, a tuner, an oscillator, a digital signal processor, a codec chip set, a subscriber identity module card, and the like. The radio frequency circuit 1304 may communicate with other terminals by using at least one wireless communication protocol. The wireless communication protocol includes but is not limited to a world wide web, a metropolitan area network, an intranet, generations of mobile communication networks (2G, 3G, 4G, and 5G), a wireless local area network, and/or a wireless fidelity (Wi-Fi) network. In some embodiments, the radio frequency circuit 1304 may further include a circuit related to near field communication (NFC), which is not limited in this application.

The display screen 1305 is configured to display a user interface (UI). The UI may include a graph, text, an icon, a video, and any combination thereof. When the display screen 1305 is a touch display screen, the display screen 1305 further has a capability of collecting a touch signal on or above a surface of the display screen 1305. The touch signal may be inputted to the processor 1301 as a control signal for processing. In this case, the display screen 1305 may be further configured to provide a virtual button and/or a virtual keyboard that are/is also referred to as a soft button and/or a soft keyboard. In some embodiments, there may be one display screen 1305 disposed on a front panel of the terminal 1300. In some other embodiments, there may be at least two display screens 1305 disposed on different surfaces of the terminal 1300 respectively or in a folded design. In still other embodiments, the display screen 1305 may be a flexible display screen disposed on a curved surface or a folded surface of the terminal 1300. Even, the display screen 1305 may be further configured in a non-rectangular irregular pattern, namely, a special-shaped screen. The display screen 1305 may be prepared by using materials such as a liquid crystal display (LCD) or an organic light-emitting diode (OLED).

The camera component 1306 is configured to capture images or videos. In some embodiments, the camera component 1306 includes a front-facing camera and a rear-facing camera. Generally, the front-facing camera is disposed on the front panel of the terminal 1300, and the rear-facing camera is disposed on a back surface of the terminal. In some embodiments, there are at least two rear-facing cameras, which are respectively any of a main camera, a depth-of-field camera, a wide-angle camera, and a telephoto camera, to achieve background blur through fusion of the main camera and the depth-of-field camera, panoramic photographing and virtual reality (VR) photographing through fusion of the main camera and the wide-angle camera, or other fusion photographing functions. In some embodiments, the camera component 1306 may further include a flash. The flash may be a monochrome temperature flash, or may be a double color temperature flash. The double color temperature flash is a combination of a warm light flash and a cold light flash, and may be used for light compensation under different color temperatures.

The audio circuit 1307 may include a microphone and a speaker. The microphone is configured to acquire acoustic waves of a user and an environment, and convert the acoustic waves into an electrical signal to input to the processor 1301 for processing, or input to the radio frequency circuit 1304 for implementing voice communication. For a purpose of stereo acquisition or noise reduction, there may be a plurality of microphones, respectively disposed at different portions of the terminal 1300. The microphone may alternatively be an array microphone or an omni-directional acquisition type microphone. The speaker is configured to convert an electric signal from the processor 1301 or the radio frequency circuit 1304 into acoustic waves. The speaker may be a conventional film speaker, or may be a piezoelectric ceramic speaker. When the speaker is the piezoelectric ceramic speaker, the speaker not only can convert an electric signal into acoustic waves audible to a human being, but also can convert an electric signal into acoustic waves inaudible to a human being, for ranging and other purposes. In some embodiments, the audio circuit 1307 may further include an earphone jack.

The power supply 1308 is configured to supply power to components in the terminal 1300. The power supply 1308 may be an alternating current, a direct current, a disposable battery, or a rechargeable battery. When the power supply 1308 includes a rechargeable battery, the rechargeable battery may be a wired rechargeable battery or a wireless rechargeable battery. The wired rechargeable battery is a battery charged through a wired circuit, and the wireless rechargeable battery is a battery charged through a wireless coil. The rechargeable battery may be further configured to support a fast charging technology.

In some embodiments, the terminal 1300 further includes one or more sensors 1309. The one or more sensors 1309 include but are not limited to an acceleration sensor 1310, a gyroscope sensor 1311, a pressure sensor 1312, an optical sensor 1313, and a proximity sensor 1314.

A person skilled in the art may understand that the structure shown in FIG. 13 constitutes no limitation on the terminal 1300, and the terminal may include more or fewer components than those shown in the figure, or some components may be combined, or different component deployments may be used.

An embodiment of this application further provides a non-transitory computer-readable storage medium. The readable storage medium has at least one instruction, at least one program, and a code set or an instruction set stored thereon, and the at least one instruction, the at least one program, and the code set or the instruction set are loaded and executed by a processor of a computer device to implement the friend-making content recommendation method provided in the foregoing method embodiments.

An embodiment of this application further provides a computer program product or a computer program. The computer program product or the computer program includes computer instructions stored in a computer-readable storage medium. A processor of a computer device reads the computer instructions from the computer-readable storage medium, and the processor executes the computer instructions to enable the computer device to perform the friend-making content recommendation method provided in the foregoing method embodiments.

What is claimed is:

1. A method for recommending friends to a virtual character of a first user account in a virtual environment performed by a computer device, the method comprising:

displaying a friend-recommendation question answering interface, the friend-recommendation question answering interface including the virtual character of the first user account, a friend-recommendation question, and a plurality of movement paths in the virtual environment, and each movement path corresponding to a respective one of a plurality of candidate answers to the friend-recommendation question;

receiving a virtual character movement operation by a user of the computer device;

animating movement, in accordance with the received virtual character movement operation, of the virtual character in the virtual environment to a position on a particular movement path of the plurality of movement paths;

determining, based on the position of the virtual character on the particular movement path of the plurality of movement paths, selection of a respective answer of the plurality of candidate answers corresponding to the particular movement path;

displaying a friend-recommendation interface, the friend-recommendation interface including friend-recommendation content recommended to the first user account based on the determined selection of the respective answer; and displaying, on the friend-recommendation interface, at least one of the following pieces of information:

a recommended virtual character;

a virtual building of the recommended virtual character; and a group of a plurality of recommended virtual characters.

2. The method according to claim 1, wherein the friend-recommendation question answering interface corresponds to a plurality of friend-recommendation questions, the friend-recommendation question answering interface includes an $i^{th}$ friend-recommendation question and a plurality of movement paths corresponding to the $i^{th}$ friend-recommendation question, and i is a positive integer; and the animating movement of the virtual character in the virtual environment to a position on a particular movement path of the plurality of movement paths comprises:

animating movement, in response to the virtual character movement operation, of the virtual character on the movement path corresponding to the $i^{th}$ friend-recommendation question; and displaying, in response to the position of the virtual character being an end point of the movement path corresponding to the $i^{th}$ friend-recommendation question, an $(i+1)^{th}$ friend-recommendation question and a plurality of movement paths corresponding to the $(i+1)^{th}$ friend-recommendation question in the friend-recommendation question answering interface.

3. The method according to claim 2, wherein the displaying the friend-recommendation interface comprises:

displaying the friend-recommendation interface in response to the position of the virtual character being an end point of the particular movement path corresponding to a final friend-recommendation question.

4. The method according to claim 2, further comprising:

determining, in response to the position of the virtual character being the end point of the selected movement path corresponding to the $i^{th}$ friend-recommendation question, a candidate answer corresponding to the movement path as a selected answer to the $i^{th}$ friend-recommendation question; and determining the friend-recommendation content based on selected answers to all of the friend-recommendation questions.

5. The method according to claim 1, further comprising:

displaying, adjacent each of the plurality of movement paths, a candidate answer corresponding to the movement path.

6. The method according to claim 1, further comprising:

displaying, in response to the position of the virtual character being on the particular movement path among the plurality of movement paths, a plurality of second user accounts adjacent the selected movement path, each second user account being a user account that selects a candidate answer corresponding to the particular movement path.

7. The method according to claim 1, further comprising:

displaying, in response to the position of the virtual character being on the particular movement path among the plurality of movement paths, an avatar of a second user account adjacent the particular movement path that selects a candidate answer corresponding to the selected movement path; and adjusting a transparency of the avatar of the second user account in accordance with a moving progress of the virtual character, and the moving progress of the virtual character indicating a progress of the virtual character moving from a starting point of the particular movement path to an end point of the particular movement path.

8. The method according to claim 1, further comprising:

displaying, in response to the position of the virtual character being on the particular movement path among the plurality of movement paths, predicted recommendation information adjacent the particular movement path when a movement distance on the particular movement path satisfies a distance threshold.

9. The method according to claim 1, wherein the plurality of movement paths comprise a first movement path and a second movement path; and the method further comprises:

displaying, in response to the position of the virtual character being on the first movement path, the movement of the virtual character in a first motion form; and displaying, in response to the position of the virtual character being on the second movement path, the movement of the virtual character in a second motion form, the first motion form being different from the second motion form.

10. A computer device, comprising a processor and a memory, the memory having at least one program stored therein, the at least one program being loaded and executed by the processor to perform a method for recommending friends to a virtual character of a first user account in a virtual environment, the method including:

displaying a friend-recommendation question answering interface, the friend-recommendation question answering interface including the virtual character of the first user account, a friend-recommendation question, and a plurality of movement paths in the virtual environment, and each movement path corresponding to a respective one of a plurality of candidate answers to the friend-recommendation question;

receiving a virtual character movement operation by a user of the computer device;

animating movement, in accordance with the received virtual character movement operation, of the virtual character in the virtual environment to a position on a particular movement path of the plurality of movement paths;

determining, based on the position of the virtual character on the particular movement path of the plurality of movement paths, selection of a respective answer of the plurality of candidate answers corresponding to the particular movement path;

displaying a friend-recommendation interface, the friend-recommendation interface including friend-recommendation content recommended to the first user account based on the determined selection of the respective answer; and displaying, on the friend-recommendation interface, at least one of the following pieces of information:

a recommended virtual character;

a virtual building of the recommended virtual character; and a group of a plurality of recommended virtual characters.

11. The computer device according to claim 10, wherein the friend-recommendation question answering interface corresponds to a plurality of friend-recommendation questions, the friend-recommendation question answering interface includes an $i^{th}$ friend-recommendation question and a plurality of movement paths corresponding to the $i^{th}$ friend-recommendation question, and i is a positive integer; and the animating movement of the virtual character in the virtual environment to a position on a particular movement path of the plurality of movement paths comprises:

animating movement, in response to the virtual character movement operation, of the virtual character on the movement path corresponding to the $i^{th}$ friend-recommendation question; and displaying, in response to the position of the virtual character being an end point of the movement path corresponding to the $i^{th}$ friend-recommendation question, an $(i+1)^{th}$ friend-recommendation question and a plurality of movement paths corresponding to the $(i+1)^{th}$ friend-recommendation question in the friend-recommendation question answering interface.

12. The computer device according to claim 11, wherein the displaying the friend-recommendation interface comprises:

displaying the friend-recommendation interface in response to the position of the virtual character being an end point of the particular movement path corresponding to a final friend-recommendation question.

13. The computer device according to claim 11, wherein the method further comprises:

determining, in response to the position of the virtual character being the end point of the movement path corresponding to the $i^{th}$ friend-recommendation question, a candidate answer corresponding to the movement path as a selected answer to the $i^{th}$ friend-recommendation question; and determining the friend-recommendation content based on selected answers to all of the friend-recommendation questions.

14. The computer device according to claim 10, wherein the method further comprises:

displaying, adjacent each of the plurality of movement paths, a candidate answer corresponding to the movement path.

15. The computer device according to claim 10, wherein the method further comprises:

displaying, in response to the position of the virtual character being on the particular movement path among the plurality of movement paths, a plurality of second user accounts adjacent the selected movement path, each second user account being a user account that selects a candidate answer corresponding to the particular movement path.

16. The computer device according to claim 10, wherein the method further comprises:

displaying, in response to the position of the virtual character being on the particular movement path among the plurality of movement paths, an avatar of a second user account adjacent the particular movement path that selects a candidate answer corresponding to the selected movement path; and adjusting a transparency of the avatar of the second user account in accordance with a moving progress of the virtual character, and the moving progress of the virtual character indicating a progress of the virtual character moving from a starting point of the particular movement path to an end point of the particular movement path.

17. The computer device according to claim 10, wherein the method further comprises:

displaying, in response to the position of the virtual character being on the particular movement path among the plurality of movement paths, predicted recommendation information adjacent the particular movement path when a movement distance on the particular movement path satisfies a distance threshold.

18. A non-transitory computer-readable storage medium, having at least one program stored thereon, the at least one program, when loaded and executed by a processor of a computer device, causing the computer device to perform a method for recommending friends to a virtual character of a first user account in a virtual environment, the method including:

displaying a friend-recommendation question answering interface, the friend-recommendation question answering interface including the virtual character of the first user account, a friend-recommendation question, and a plurality of movement paths in the virtual environment, and each movement path corresponding to a respective one of a plurality of candidate answers to the friend-recommendation question;

receiving a virtual character movement operation by a user of the computer device;

animating movement, in accordance with the received virtual character movement operation, of the virtual character in the virtual environment to a position on a particular movement path of the plurality of movement paths;

determining, based on the position of the virtual character on the particular movement path of the plurality of movement paths, selection of a respective answer of the plurality of candidate answers corresponding to the particular movement path;

displaying a friend-recommendation interface, the friend-recommendation interface including friend-recommendation content recommended to the first user account based on the determined selection of the respective answer; and displaying, on the friend-recommendation interface, at least one of the following pieces of information:

a recommended virtual character;

a virtual building of the recommended virtual character; and a group of a plurality of recommended virtual characters.

* * * * *